(12) United States Patent
Kardos et al.

(10) Patent No.: US 10,787,935 B2
(45) Date of Patent: Sep. 29, 2020

(54) COOLING ARRANGEMENT FOR A WHR-SYSTEM

(71) Applicant: Scania CV AB, Södertälje (SE)

(72) Inventors: Zoltan Kardos, Södertälje (SE); Ola Hall, Stockholm (SE)

(73) Assignee: SCANIA CV AB (SE)

( * ) Notice: Subject to any disclaimer, the term of this patent is extended or adjusted under 35 U.S.C. 154(b) by 480 days.

(21) Appl. No.: 15/523,533

(22) PCT Filed: Nov. 4, 2015

(86) PCT No.: PCT/SE2015/051167
§ 371 (c)(1),
(2) Date: May 1, 2017

(87) PCT Pub. No.: WO2016/089277
PCT Pub. Date: Jun. 9, 2016

(65) Prior Publication Data
US 2017/0306806 A1    Oct. 26, 2017

(30) Foreign Application Priority Data
Dec. 5, 2014  (SE) ........................................ 1451489

(51) Int. Cl.
*F01K 23/10* (2006.01)
*F01K 23/06* (2006.01)
(Continued)

(52) U.S. Cl.
CPC ............ *F01K 23/101* (2013.01); *F01K 9/003* (2013.01); *F01K 23/065* (2013.01); *F01K 23/10* (2013.01);
(Continued)

(58) Field of Classification Search
CPC ........ F01K 23/065; F01K 17/04; F01K 23/10; F01K 23/101; F01K 25/08; F01K 9/003;
(Continued)

(56) References Cited

U.S. PATENT DOCUMENTS 8,365,527 B2 *  2/2013  Raab ...................... F02M 26/24
                                                      123/41.01
9,175,600 B2 * 11/2015  Park ......................... F02G 5/02
(Continued)

OTHER PUBLICATIONS

International Search Report dated Apr. 1, 2016 in corresponding PCT International Application No. PCT/SE2015/051167.
(Continued)

*Primary Examiner* — Laert Dounis
*Assistant Examiner* — Edward Bushard
(74) *Attorney, Agent, or Firm* — Ostrolenk Faber LLP

(57) ABSTRACT

A cooling arrangement for a WHR-system in a vehicle, includes a first cooling circuit including a first radiator in which a circulating coolant is cooled, and a second cooling circuit including a second radiator in which a coolant is cooled to a lower temperature than the coolant in the first radiator. A condenser inlet line directs coolant from one of the cooling circuits to a condenser to provide cooling for a working medium flowing therethrough. A cooling adjusting device adjusts the temperature of the coolant in the inlet line to the condenser by the coolant in the other cooling circuit based on information received about the coolant such that the coolant in the condenser inlet line provides the estimated suitable cooling of the working medium in the condenser.

17 Claims, 2 Drawing Sheets

(51) Int. Cl.
*F01P 3/20* (2006.01)
*F01K 9/00* (2006.01)
*F01K 25/08* (2006.01)
*F02G 5/02* (2006.01)
*F28B 1/02* (2006.01)
*F28B 11/00* (2006.01)
*F02G 5/04* (2006.01)

(52) U.S. Cl.
CPC ............... *F01K 25/08* (2013.01); *F01P 3/20* (2013.01); *F02G 5/02* (2013.01); *F28B 1/02* (2013.01); *F28B 11/00* (2013.01); F01P 2060/00 (2013.01); *F02G 5/04* (2013.01); F02G 2260/00 (2013.01); *Y02T 10/166* (2013.01)

(58) Field of Classification Search
CPC .......... F02G 2260/00; F02G 5/04; F02G 5/02; Y02T 10/166; Y02T 10/146; Y02T 10/16; F01N 2240/02; F01N 3/2885; F01N 3/2889; F01N 5/02; F01P 2060/00; F01P 2060/02; F01P 7/165; F02B 29/0412; F02B 29/0443; F02B 37/013; F02M 26/08; F02M 26/24; F02M 26/28; F28B 11/00; F28B 1/02; Y02E 20/14
USPC .......................................... 60/614, 615, 618
See application file for complete search history.

(56) References Cited

U.S. PATENT DOCUMENTS

| 9,470,115 | B2* | 10/2016 | Ernst .................... F01K 23/065 |
| 9,879,569 | B2* | 1/2018 | Franke ................. F01K 23/065 |
| 10,006,314 | B2* | 6/2018 | Lutz ..................... F01K 23/065 |
| 2011/0048012 | A1 | 3/2011 | Ernst et al. ..................... 60/651 |
| 2012/0198840 | A1 | 8/2012 | Stegmaier et al. .......... 60/605.1 |
| 2013/0118423 | A1 | 5/2013 | Lutz et al. ................. 123/41.08 |
| 2014/0007575 | A1 | 1/2014 | Ernst et al. ..................... 60/618 |

OTHER PUBLICATIONS

Written Opinion dated Apr. 1, 2016 in corresponding PCT International Application No. PCT/SE2015/051167.

* cited by examiner

COOLING ARRANGEMENT FOR A WHR-SYSTEM

CROSS-REFERENCE TO RELATED APPLICATIONS

The present application is a 35 U.S.C. §§ 371 national phase conversion of PCT/SE2015/051167, filed Nov. 4, 2015, which claims priority of Swedish Patent Application No. 1451489-7, filed Dec. 5, 2014, the contents of which are incorporated by reference herein. The PCT International Application was published in the English language.

BACKGROUND OF THE INVENTION AND PRIOR ART

The present invention relates to a cooling arrangement for a WHR-system.

WHR system (Waste Heat Recovery System) can be used in vehicles for recovering waste thermal energy and converting it to mechanical energy or electric energy. A WHR system includes a pump which pressurizes and circulates a working medium in a closed circuit. The circuit comprises one or several evaporators where the working medium is heated and evaporated by one or several heat sources, for example, the exhaust gases from a combustion engine. The pressurized and heated gaseous working medium is directed to an expander where it expands. The expander generates mechanical energy which can be used to operate the vehicle or apparatuses on the vehicle. Alternatively, the expander is connected to a generator which generates electric energy. The working medium leaving the expander is directed to a condenser. The working medium is cooled down in the condenser to a temperature at which it condenses. The liquefied working medium is redirected to the pump which pressurizes the medium. Thus, the waste heat energy from, for example, the exhaust gases from a combustion engine in a vehicle can be recovered by means of a WHR-system. Consequently, a WHR-system can reduce fuel consumption in a vehicle.

In order to achieve a high thermal efficiency in a WHR-system, the working medium in the condenser is to be cooled to a condensation temperature as low as possible and substantially without subcooling. Consequently, in order to achieve a high thermal efficiency in a WHR-system, the working medium has to be cooled with a suitable cooling effect. However, the suitable cooling effect of the working medium in the condenser varies during different operating conditions such as with the heat effect supplied from, for example, the exhaust gases to the evaporator. Since the supplied heat from exhaust gases can vary rapidly, it is difficult to continuously provide a suitable cooling effect and a high thermal efficiency of a WHR-system.

US 2013/0118423 shows a cooling circuit with a circulating coolant which cools a motor. The cooling circuit comprises a cooling line where the coolant cools a working medium in a condenser of a WHR-system and a bypass line leading the medium past the condenser. The coolant flow through the bypass line is controlled by a relief valve which open at a specific pressure.

SUMMARY OF THE INVENTION

The object of the present invention is to provide a cooling arrangement which is able to provide a cooling effect of a working medium in a condenser of a WHR-system in a manner such that the WHR-system substantially continuously operates with a high thermal efficiency.

The above mentioned object is achieved by the cooling arrangement according to the invention. In order to continuously maintain a high thermal efficiency in a WHR-system, it is necessary to adjust the cooling effect of the working medium in the condenser during different operating conditions. The cooling arrangement comprises two cooling circuits with coolants of two different temperatures. The coolant in one of the cooling circuits is used to cool the working medium in the condenser. The cooling arrangement comprises a control unit receiving substantially continuously information from a sensor about a parameter related to the cooling of the working medium in the condenser. In case the parameter indicates that the coolant provides a too poor or a too high cooling of the working medium in the condenser, the control unit controls the cooling adjusting means such that the temperature of the coolant directed to the condenser is adjusted by means of the coolant with the different temperature in the other cooling circuit. Such an adjustment of the temperature of the coolant directed to the condenser can be provided in a relatively simple and quick manner. As a result, it is possible to obtain a substantially continuously high thermal efficiency of the WHR-system during different operating conditions.

According to an embodiment of the invention, the cooling adjusting means comprises a heat exchanger receiving the coolant directed to the condenser and a control valve configured to direct an adjustable part of the coolant in the other cooling circuit to the heat exchanger in order to adjust the temperature of the coolant directed to the condenser. Such a control valve makes it is possible to vary the flow of the coolant of the other cooling circuit to the heat exchanger. As a result, it is possible to adjust the cooling or the heating of the coolant directed to the condenser to a temperature at which the working medium in the condenser obtains a suitable cooling.

According to an embodiment of the invention, the cooling adjusting means comprises a control valve configured to direct an adjustable coolant flow to the condenser. The cooling effect of the coolant is related to the temperature and the flow of the coolant directed to the condenser. In this case, the control valve controls the flow of the coolant to the condenser. It is of course possible to adjust both the temperature and the flow of the coolant directed to the condenser.

According to an embodiment of the invention, the sensor senses a parameter related to the condensing pressure in the condenser. In order to achieve a thermal efficiency of an expander in a WHR-system, the condensation pressure in the condenser should be as low as possible. The sensor may be a pressure sensor which senses the pressure in the condenser or may be in a position immediately downstream of the condenser in the WHR-circuit. Alternatively, the sensor may be a temperature sensor sensing the condensing temperature of the medium in the condenser or may be in a position immediately downstream of the condenser. The condensation temperature corresponds to a specific condensation pressure for the working medium.

According to an embodiment of the invention, the cooling arrangement is configured to cool the working medium in the condenser such that the working medium attains a condensation pressure within a predetermined pressure range. For practical reasons, it is many times suitable to avoid negative pressures in a WHR-system. In this case, it is suitable to obtain a condensation pressure just above 1 bar. The predetermined pressure range may, for example, be 1.1-1.5 bar. The predetermined pressure range corresponds to a corresponding temperature range for the working medium.

According to an embodiment of the invention, the cooling arrangement comprises temperature sensors configured to sense the temperature difference of the coolant over the condenser. By information of the temperature difference over the condenser, the coolant flow and the specific heat capacity of the coolant, it is possible to calculate the cooling effect of the working medium in the condenser. The control unit may have information about a suitable cooling effect during different operating conditions. In case the cooling effect is too low, the cooling adjusting means is controlled such that coolant directed to the condenser obtains a lower temperature. In case the cooling effect is too high, the cooling adjusting means is controlled such that the coolant directed to the condenser obtains a higher temperature.

According to an embodiment of the invention, the coolant in the first cooling circuit is configured to cool a combustion engine. In this case, the coolant in the first cooling circuit has a relatively high temperature which may be within the temperature range of 90° C.-100° C. In this case, the first cooling circuit is an ordinary cooling system for a combustion engine in a vehicle. The coolant in the second cooling circuit has preferably a considerably lower temperature. The second cooling circuit may be a low temperature cooling circuit. The low temperature cooling circuit may, for example, cool charged air in a charged air cooler, a refrigerant in an AC cooler, gearbox oil in an oil cooler and recirculating exhaust gases in an EGR cooler.

According to an embodiment of the invention, the coolants are cooled in the respective radiators by an air flow, wherein the second radiator is arranged in an upstream position of the first radiator. Thus, the coolant in the second radiator is cooled with air of a lower temperature than the coolant in the first radiator. Consequently, the coolant in the second cooling circuit is cooled to a lower temperature than the coolant in the first cooling circuit. The air flow may be ram air generated by the forward movement of the vehicle. Usually, the radiator fan is turned off when the WHR-system is activated.

According to an embodiment of the invention, at least one of the cooling circuits comprises a control valve able to direct a part of the coolant flow in the cooling circuit to the radiator and a remaining part of the coolant in a bypass line past the radiator, whereupon the different parts are mixed before the coolant enters the heat exchanger. In this case, it is possible to create two temperature levels of different sizes in one cooling circuit and mix them such that the coolant directed to the heat exchanger attains a defined temperature.

According to an embodiment of the invention, the heat exchanger is arranged in a branch line receiving coolant from a first line 51 of the first cooling circuit and returning coolant to a second line 52 of the first cooling circuit, wherein the coolant has a lower temperature in the second line than in the first line. In this case, coolant from a warmer part of the first cooling circuit is directed to the heat exchanger where it is cooled to a lower temperature. It is suitable to return the coolant to a part of the first cooling circuit having a corresponding temperature. The branch line may receive coolant from an engine outlet line in the first cooling circuit. In this case, the branch line receives coolant having the highest temperature in the first cooling circuit.

According to an embodiment of the invention, the first cooling circuit and the second cooling circuit constitute separate circuits with separate coolants. In this case, it is possible to accomplish a very low temperature of the coolant in the second cooling circuit and a large temperature difference between the coolant in the first cooling circuit and the second cooling circuit.

According to an embodiment of the invention, the working medium is heated in an evaporator of the WHR-system by means of exhaust gases from a combustion engine powering the vehicle. The exhaust gases contain a lot of heat energy, which usually is supplied to the environment. By means of a WHR-system, it is possible to recover a large part of the heat energy in the exhaust gases.

According to an embodiment of the invention, the working medium in the WHR-system is ethanol. Ethanol has an evaporation temperature of about 78° C. at a pressure of 1 bar. It is relatively easy to accomplish a coolant temperature at a suitable level below the evaporation temperature of ethanol and cool the ethanol in a condenser to a condensation temperature of about 78° C. However, it is possible to use other working mediums such as for example R245fa. R245fa has an evaporation temperature of about 15° C. at 1 bar. In this case, the coolant requires an essentially lower evaporation temperature.

BRIEF DESCRIPTION OF THE DRAWINGS

In the following preferred embodiments of the invention are described, as examples, with reference to the attached drawings, in which.

DESCRIPTION OF PREFERRED
EMBODIMENTS OF THE INVENTION

Figure 1:
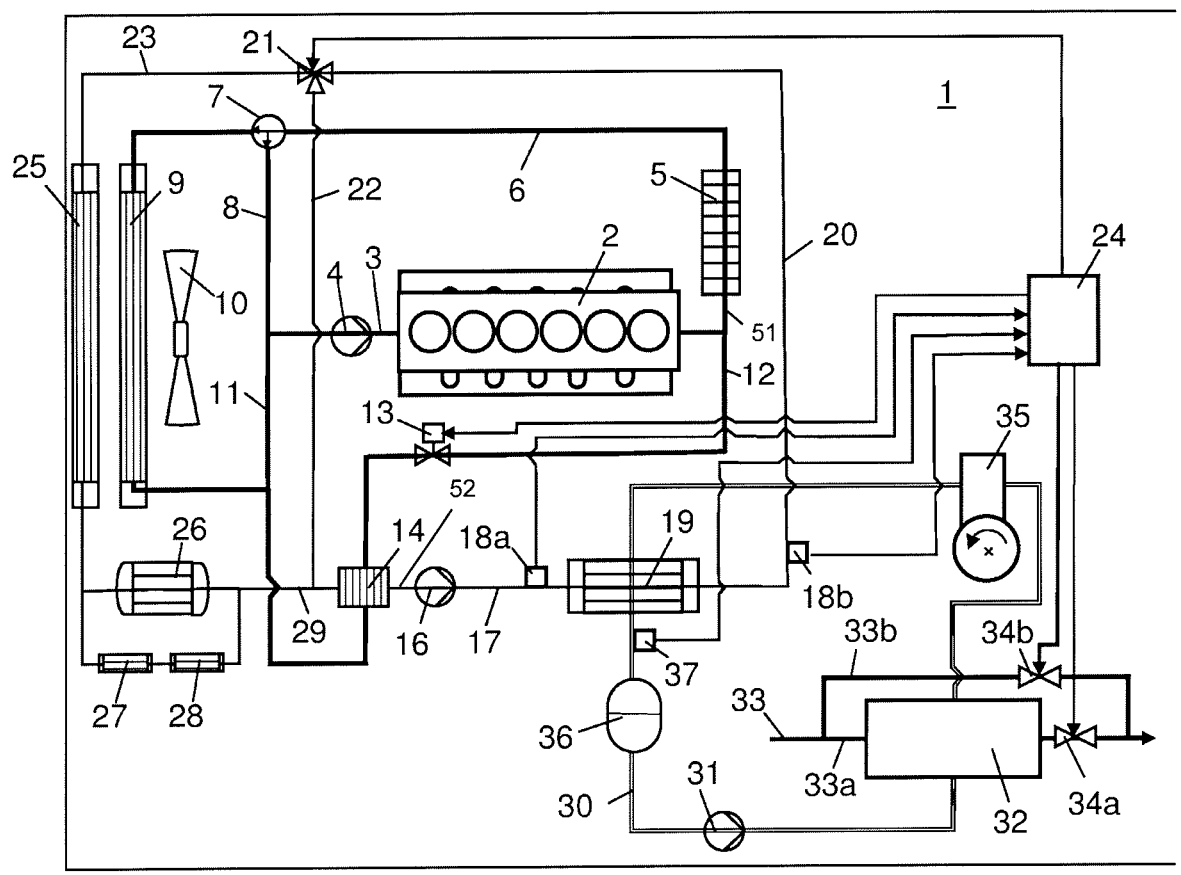
FIG. 1 shows a first embodiment of the arrangement and
FIG. 2 shows a second embodiment of the arrangement

FIG. 1 shows a combustion engine 2 powering a schematically disclosed vehicle 1. The combustion engine 2 may be a diesel engine. The vehicle 1 may be a heavy vehicle. The vehicle 1 comprises a first high temperature cooling circuit. The first cooling circuit comprises an engine inlet line 3 provided with a first pump 4 circulating a first coolant in the first cooling circuit. The first pump 4 directs the coolant to the combustion engine 2. When the coolant has circulated through the combustion engine 2, it enters an engine outlet line 6 comprising a retarder cooler 5. The coolant is intended to cool oil in the retarder cooler 5 during occasions when a retarder is activated. A thermostat 7 is arranged at an end of the engine outlet line 6. In case the coolant has a lower temperature than the regulating temperature of the thermostat 7, the coolant is directed back to the first pump 4 via a first return line 8. In case the coolant has a higher temperature than the regulating temperature of the thermostat 7, the coolant is directed to a first radiator 9 arranged at a front portion of the vehicle 1. The ram air and a radiator fan 10 are able to provide a cooling air flow through the first radiator 9. When the coolant has circulated through the first radiator 9, it is directed, via a second return line 11, back to the engine inlet line 3 and the first pump 4.

The first cooling circuit comprises a branch line 12. The branch line 12 receives coolant from the engine outlet line 6. The branch line 12 comprises a control valve 13 controlling the coolant flow in the branch line 12 and a heat exchanger 14. The branch line 12 comprises an outlet returning the coolant to the second return line 11 of an ordinary part of the first cooling circuit.

The vehicle 1 comprises a second low temperature cooling circuit. The low temperature cooling circuit comprises a second pump 4 circulating a second coolant in the second cooling circuit. The second pump 16 directs the coolant, via a condenser inlet line 17, to a condenser 19 of a WHR-system. The condenser inlet line 17 comprises a first temperature sensor 18*a* sensing the temperature of the coolant in a position upstream of the condenser 19. The coolant leaves the condenser 19 via a condenser outlet line 20. The condenser outlet line 20 comprises a second temperature sensor 18*b* sensing the temperature of the coolant in a position downstream of the condenser 19. The condenser outlet line conducts the coolant to a control valve 21. The control valve 21 directs the coolant to a bypass line 22 or to a second radiator 25 via a radiator inlet line 23.

The second radiator 25 is arranged at the front portion of the vehicle 1 in an upstream position of the first radiator 9 in view of the air flow direction defined by the radiator fan 10. Thus, the coolant in the second radiator 25 is cooled by air with a lower temperature than the coolant in the first radiator 9. The coolant leaving the second radiator 25 cools charge air in a charge air cooler 26, a refrigerant in an AC cooler 27 and gearbox oil in an oil cooler 28. The coolant in the second cooling are directed from said coolers 26-28, via a heat exchanger inlet line 29, to the heat exchanger 14. The heat exchanger inlet line 29 is connected to the bypass line 22. Thus, the heat exchanger inlet line 29 receives coolant from the bypass line 22 and/or the second radiator 25. The coolant leaving the heat exchanger 14 is directed back to the second pump 4 and the condenser inlet line 17. A control unit 24 receives information from the first temperature sensor 18*a* and the second temperature sensor 18*b* about the coolant temperature before and after the condenser 19.

The vehicle is provided with a WHR-system (Waste Heat Recovery system). The WHR-system comprises a pump 31 which pressurizes and circulates a working medium in a closed a circuit 30. In this case, the working medium is ethanol. However, it is possible to use other kinds of working mediums such as, for example, R245fa. The pump 31 pressurizes and circulates the working medium to an evaporator 32. The working medium is heated in the evaporator 32 by exhaust gases. The exhaust gases are supplied, via an exhaust line 33 from the combustion engine 2 to the evaporator 32. The exhaust line 33 is branch into a heat line 33*a* extending through the evaporator 32 and a bypass line 33*b* leading the exhaust gases past the evaporator 32. The exhaust flow through the heat line 33*a* is controlled by a first valve 34*a* and the exhaust flow through the bypass line 33*b* is controlled by a second valve 34*b*. The control unit 24 controls the first valve 34*a* and the second valve 34*b* and thus the exhaust flow through the evaporator 32. During most operating conditions, the entire exhaust gas flow is directed through the heat line 33*a*. The working medium is heated by the exhaust gases in the evaporator 32 to a temperature at which it evaporates.

The working medium is circulated in gaseous form from the evaporator 32 to the expander 35. The pressurised and heated working medium expands in the expander 35. The expander 35 generates a rotary motion which may be transmitted, via a suitable mechanical transmission, to a shaft of the power train of the vehicle 1. Alternatively, the expander 35 may be connected to a generator transforming the rotary movement of the expander to electrical energy. The electrical energy may be stored in a battery. When the working medium has passed through the expander 35, it is directed to the condenser 19. The working medium is cooled in the condenser 19 by the coolant in the second cooling circuit to a temperature at which it condenses. A pressure sensor 37 senses the pressure in the circuit 30 in a position immediately downstream of the condenser 19. The control unit 24 receives information from the pressure sensor 37 of the condensation pressure in the condenser 19. The working medium is directed from the condenser 19 to a receiver 36. The pump 31 sucks working medium from a bottom portion of the receiver 36 ensuring that only working medium in liquid form is supplied to the pump 31.

During operation of the combustion engine 2, the first pump 4 circulates coolant in the first cooling circuit such that it cools the combustion engine 2. The second pump 4 circulates coolant in the second cooling circuit such that it cools said mediums in the coolers 26-28 before it cools the working medium in the condenser 19. In order to achieve a high thermal efficiency in a WHR-system, the working medium in the condenser 19 is to be cooled by a cooling effect varying during different operating condition. Since the exhaust gases supplies a variable heat effect to the evaporator 32, it is necessary to provide a correspondingly variable cooling effect of the working medium in the condenser 19. It is favorable to establish a condensation pressure as low as possible at the different operating conditions and without subcooling of the working medium. Furthermore, it is suitable to avoid negative pressure in the WHR-system by practical reasons. In view of these facts, it is suitable to provide a cooling of the working medium in the condenser 19 to a condensation pressure just above 1 bar and without subcooling. In order to maintain a high thermal efficiency, it is necessary to adjust the cooling effect of the working medium in the condenser 19 in view of the supplied heat energy from the combustion engine 2 such that the condensation pressure will be just above 1 bar. The working medium ethanol has a condensation temperature of 78° C. at 1 bar. In this case, it is suitable to accomplish a condensation temperature of just above 78° C. in the condenser 19.

During most operating conditions the control unit 24 sets the control valve 21 in a position in which the coolant in the second cooling circuit is directed to the first radiator 25 where the coolant is cooled to a low temperature. When the coolant has cooled said mediums in the coolers 26-28, the coolant has still a relatively low temperature. During most operating conditions, the coolant in the second cooling circuit provides a too heavy cooling effect of the working medium in the condenser 19. However, it is possible by the control valve 21 to direct a first part of the coolant flow to the bypass line 22 and a second part of the coolant flow to the second radiator 25. The first non-cooled part of the coolant flow from the bypass line 22 is mixed with the cooled second part of the coolant flow from the second radiator 25 in heat exchanger inlet line 29. In this case, it is possible to conduct coolant in the second cooling line with a variable temperature to the condenser 19.

In this case, the control unit 24 is configured to maintain a condensation pressure within a pressure range of, for example, 1.1-1.5 bar in the condenser 19. The control unit 24 receives substantially continuously information from the pressure sensor 37 about the current condensation pressure in the condenser 19. In case the control unit 24 receives information indicating that the condensation pressure is lower than 1.1 bar, there is a risk of negative pressure in the WHR-system. Thus, coolant in the second cooling circuit provides a too high cooling effect of the working medium in the condenser 19. The control unit 24 controls the control valve 13 such that an adjustable part of the coolant in engine outlet line 6 is directed to the branch line 12 and the heat exchanger 14. Thereby, the warmer coolant in the first cooling circuit will heat the coolant in the second cooling circuit to a suitable temperature before it enters the condenser 19. Since the control unit 24 is able to regulate the temperature of the coolant entering the condenser 19 by the control valves 13, 21, it is possible to vary the cooling effect of the working medium in the condenser 19 in a simple and quick manner.

In case, the condensation pressure becomes higher than 1.5 bar, the cooling effect of the working medium in the condenser 19 is too low. In this case, the control unit 24 controls the control valve 13 such that a smaller part of the coolant flow in the engine outlet line 6 is directed into the branch line 12. As a consequence, the coolant in the second cooling circuit is cooled to a lower temperature in the heat exchanger 14 by the reduced coolant flow in the branch line 12. Thus, the coolant in the second cooling circuit entering the condenser 19 has a lower temperature which results in an increased cooling effect of the working medium in the condenser 19. Furthermore, the control unit 24 receives information from the temperature sensors 18a, 18b about the temperature difference of the coolant over the condenser 19. In view of this information, the coolant flow through the condenser 19 and the specific heat capacity of the working medium, the control unit 24 is able to calculate the cooling effect in the condenser 19.

Figure 2:
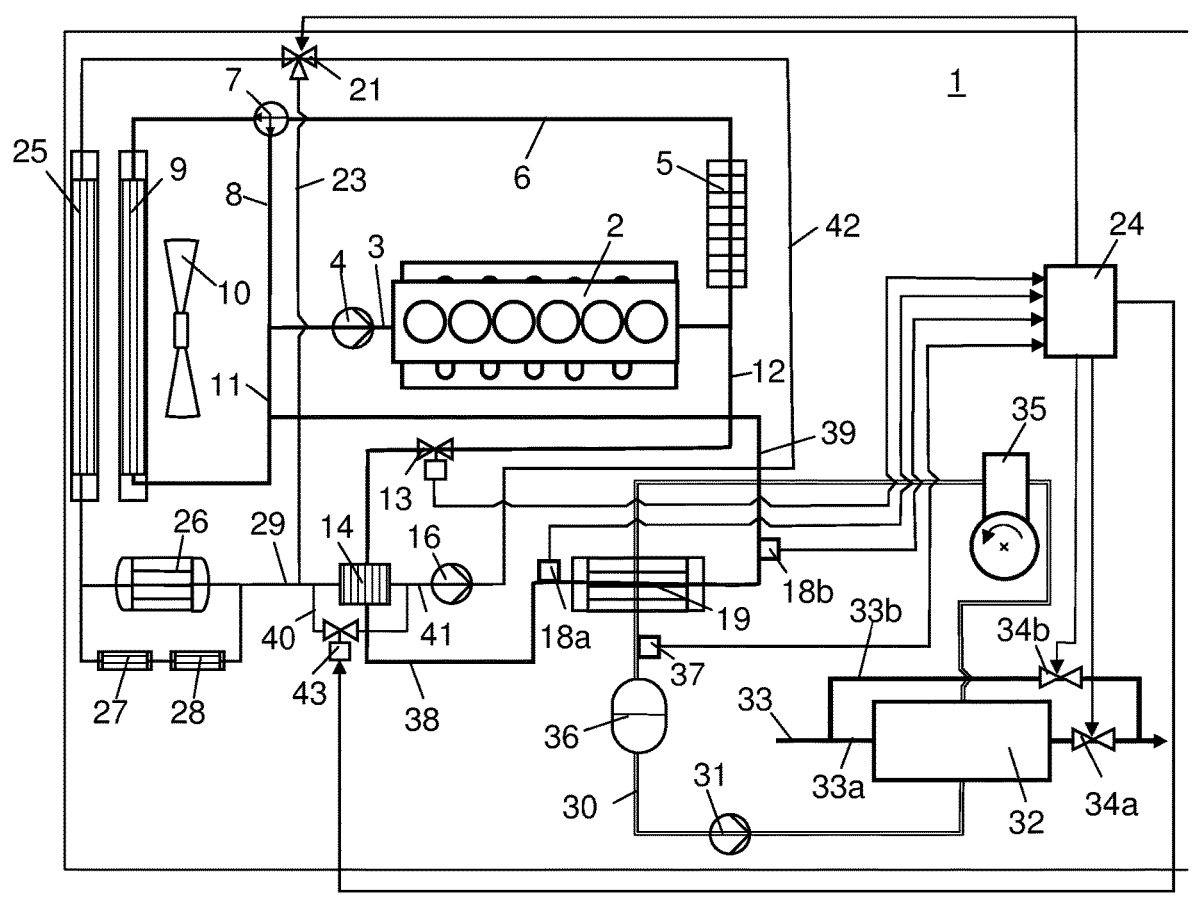

FIG. 2 shows an alternative embodiment of the cooling arrangement. The cooling arrangement comprises also in this case a first high temperature cooling circuit comprising a first radiator 9 and a second low temperature cooling circuit comprising a second radiator 25. In this case, the first coolant in the branch line 12 is directed, via the heat exchanger 14, to the condenser 19. The branch line 12 comprises further a condenser outlet line 39 directing the coolant to an ordinary part of the first cooling circuit via the second return line 11. In this case, the second coolant in the second cooling is used to cool the coolant in the branch line 12 in the heat exchanger 14. The second cooling circuit comprises a bypass line 40 conducting coolant past the heat exchanger 14 and to a heat exchanger outlet line 41 of the second cooling circuit. The coolant in the heat exchanger outlet line 41 is circulated by the second pump 16 to the control valve 21 via a return line 42. The bypass line 40 comprises a control valve 43 by which the control unit 24 controls the coolant flow through the bypass line 40.

When the coolant in the first cooling circuit has cooled the combustion engine 2, it usually has a high temperature. During most operating conditions, the coolant in the engine outlet line 6 has a too high temperature to cool the working medium in the condenser 19 in a desired manner. Also in this case, the control unit 24 is configured to maintain a condensation pressure within a pressure range of, for example, 1.1-1.5 bar. The control unit 24 receives substantially continuously information from the pressure sensor 37 about the condensation pressure in the condenser 19.

Due to the high temperature of the coolant in the branch line 12, it usually provides a too low cooling effect of the working medium in the condenser 19. As a consequence, the condensation pressure is higher than 1.5 bar. In this case, the control unit 24 may control the control valve 43 such that a suitable part of the coolant flow in the second cooling circuit is directed into the bypass line 38 and past the heat exchanger 14. The remaining part of the coolant flow in the second cooling circuit is directed through the heat exchanger 14 where it cools the coolant in the branch line 12. The remaining part of the coolant flow is dimensioned such that it cools the coolant in the branch line 12 to a desired temperature such that it cools the working medium in the condenser 19 to an evaporation temperature at a pressure within the above mentioned pressure range. Alternatively or in combination, the control unit 24 controls the control valve 13 such the coolant flow in the branch line 12 will be adjusted in a suitable manner. The control unit 24 has also the possibility to control the control valve 21 in order to adjust the temperature of the coolant in the second cooling circuit entering the heat exchanger 14.

In case the control unit 24 receives information indicating that the condensation pressure is lower than 1.1 bar, there is a risk of negative pressure in the WHR-system. Thus, the coolant provides a too high cooling effect of the working medium in the condenser 19. In this case, the control unit 24 controls the control valve 43 such that a smaller part of the coolant flow in the second cooling circuit is directed into the bypass line 38. An increased part of the coolant in the second cooling circuit is used to cool the coolant in the branch line 12. Alternatively or in combination, the control unit 24 controls the control valve 13 such the coolant flow in the branch line 12 will be adjusted in a suitable manner. The control unit 24 has also the possibility to control the control valve 21 in order to adjust the temperature of the coolant in the second cooling circuit entering the heat exchanger 14. Since the control unit 24 is able to regulate the temperature and the flow of the coolant to the condenser 19 by the control valves 13, 43, 21 it is possible to vary the cooling effect of the working medium in the condenser 19 in a simple and quick manner.

The invention is not restricted to the described embodiment but may be varied freely within the scope of the claims.

The invention claimed is:

1. A cooling arrangement for a WHR-system in a vehicle, wherein the cooling arrangement comprises:
   a first cooling circuit including a first radiator configured to cool a first coolant, a second cooling circuit including a second radiator configured to cool a second coolant to a lower temperature than the coolant in the first radiator;
   a condenser configured to cool a working medium of the WHR-system, by using a condenser coolant,
   wherein the condenser coolant is one of the first coolant or the second coolant, and the other of the first coolant or the second coolant is the other coolant;
   a condenser inlet line configured for conducting the condenser coolant from one of the first and second cooling circuits to the condenser;
   a cooling adjusting device configured for adjusting a temperature of the condenser coolant in the condenser inlet line by the other coolant conducted in the other cooling circuit of the first and second cooling circuits;
   a sensor configured for sensing a parameter related to the cooling of the working medium in the condenser; and
   a control unit configured to receive information about the parameter, to estimate a suitable cooling of the working medium in the condenser, and to control the cooling adjusting device such that the coolant in the condenser inlet line provides the estimated suitable cooling of the working medium in the condenser.

2. The cooling arrangement according to claim 1, wherein the cooling adjusting device comprises:
   a pre-condenser heat exchanger connected for receiving the condenser coolant directed to the condenser, and a
   control valve configured and connected for directing an adjustable part of the other coolant to the pre-condenser heat exchanger for adjusting the temperature of the coolant directed to the condenser.

3. The cooling arrangement according to claim 1, wherein the cooling adjusting device comprises a control valve configured to direct an adjustable coolant flow to the condenser.

4. The cooling arrangement according to claim 1, wherein the sensor is configured to sense a parameter related to a condensing pressure in the condenser.

5. The cooling arrangement according to claim 1, wherein the cooling arrangement is configured to cool the working medium in the condenser such that the working medium attains a condensation pressure within a predetermined pressure range.

6. The cooling arrangement according to claim 1, wherein the sensor comprises temperature sensors configured to sense a temperature difference of the condenser coolant over the condenser.

7. The cooling arrangement according to claim 1, further comprising:
   a combustion engine, and the first cooling circuit and the first coolant therein are configured such that the first coolant in the first cooling circuit is configured to cool the combustion engine.

8. The cooling arrangement according to claim 1, wherein the second coolant in the second cooling circuit is configured to cool a medium in at least one cooler.

9. The cooling arrangement according to claim 1, wherein the first and second radiators are configured so that the coolant in the respective first and second radiators is cooled by an air flow over the first and second radiators; and
   wherein the second radiator is arranged in an upstream position relative to the first radiator with respect an air flow direction through the radiators.

10. The cooling arrangement according to claim 2, wherein one of the cooling circuits comprises a control valve configured for directing a part of the coolant flow in the cooling circuit to the radiator and a remaining part of the coolant in a bypass line past the radiator, and
    the cooling circuit and the bypass line are configured so that the parts of the coolant are mixed and then conducted to the pre-condenser heat exchanger.

11. The cooling arrangement according to claim 2, wherein the pre-condenser heat exchanger is arranged in a branch line configured for receiving the adjustable part of the first coolant from a first line of the first cooling circuit,
    wherein the second coolant in the second line has a lower temperature than the first coolant in the first line.

12. The cooling arrangement according to claim 11, wherein the branch line is configured to receive the first coolant from an engine outlet line in the first cooling circuit.

13. The cooling arrangement according to claim 1, wherein the first cooling circuit and the second cooling circuit constitute separate circuits with separate coolants.

14. The cooling arrangement according to claim 7, further comprising an evaporator for heating the working medium, and
    the evaporator is configured for heating the working medium in the evaporator of the WHR-system by exhaust gases from the combustion engine powering the vehicle.

15. The cooling arrangement according to claim 1, wherein the working medium in the WHR-system is ethanol.

16. The cooling arrangement according to claim 2, further comprising:
    a branch line configured to convey the adjustable part of the first coolant from an engine output line of the vehicle to the control valve, and from the control valve to the pre-condenser heat exchanger,
    wherein the branch line is free of any heat exchangers before the pre-condenser heat exchanger.

17. The cooling arrangement according to claim 1, wherein the cooling adjusting device adjusts the temperature of the coolant in the condenser inlet line by controlling a valve to regulate an amount of the other coolant conveyed by at least one of the first cooling circuit and the second cooling circuit.

* * * * *